(12) United States Patent
Kim et al.

(10) Patent No.: US 6,831,833 B2
(45) Date of Patent: *Dec. 14, 2004

(54) HEAT DISSIPATOR FOR OPTICAL WRITING AND/OR REPRODUCING APPARATUS

(75) Inventors: Tae Hyoung Kim, Osan-si (KR); Kyung Hawn Park, Suwon-si (KR); Un Gyu Park, Suwon-si (KR); Tae Sung Kim, Osan-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/621,381

(22) Filed: Jul. 18, 2003

(65) Prior Publication Data

US 2004/0017657 A1 Jan. 29, 2004

Related U.S. Application Data

(63) Continuation of application No. 10/141,814, filed on May 10, 2002, now Pat. No. 6,603,659.

(30) Foreign Application Priority Data

May 10, 2001 (KR) ........................................ 2001-25587

(51) Int. Cl.[7] ................................................. H05K 7/20
(52) U.S. Cl. ...................... 361/690; 165/80.2; 165/185; 360/97.02; 361/708; 361/719; 361/715; 361/707
(58) Field of Search ............................... 165/80.2, 185, 165/80.3, 80.4; 174/16.3; 257/706–707, 711–713; 360/97.02; 361/687–721

(56) References Cited

U.S. PATENT DOCUMENTS

| | | |
|---|---|---|
| 5,045,971 A | 9/1991 | Ono et al. |
| 5,138,523 A | 8/1992 | Benck et al. |
| 5,379,185 A | 1/1995 | Griffin et al. |
| 5,777,844 A | 7/1998 | Kiefer |
| 5,969,940 A | 10/1999 | Sano et al. |
| 6,101,095 A | 8/2000 | Yamaguchi |
| 6,456,453 B1 | 9/2002 | Wauke et al. |
| 6,603,659 B2 * | 8/2003 | Kim et al. .................. 361/690 |

* cited by examiner

*Primary Examiner*—Gregory D. Thompson
(74) *Attorney, Agent, or Firm*—Birch, Stewart, Kolasch & Birch, LLP

(57) ABSTRACT

Disclosed is a heat dissipator for an optical writing and/or reproducing apparatus. The heat dissipator comprises a main base having mounted thereto a plurality of parts including at least one motor for optical writing and/or reproduction; a circuit board positioned below the main base and having installed thereon elements for controlling the parts; a heat generating element formed with a plurality of leads which are connected to a circuit pattern of the circuit board; a heat conduction member brought into contact with at least the leads, for receiving heat generated in the heat generating element; and a cabinet brought into contact with the heat conduction member and formed with an element accommodating section and/or a pair of protrusions which are shaped to be functionally associated with an outer surface of the heat generating element to ensure that the heat dissipating member is brought into close contact with the leads of the heat generating element.

19 Claims, 3 Drawing Sheets

HEAT DISSIPATOR FOR OPTICAL WRITING AND/OR REPRODUCING APPARATUS

This application is a continuation of application Ser. No. 10/141,814, filed on May 10, 2002, now U.S. Pat. No. 6,603,659 the entire contents of which are hereby incorporated by reference and for which priority is claimed under 35 U.S.C. § 120; and this application claims priority of application Ser. No. 25587/2001 filed in Korea on May 10, 2001 under 35 U.S.C. § 119.

BACKGROUND OF THE INVENTION

1. Field of the Invention

The present invention relates to a heat dissipator for an optical writing and/or reproducing apparatus, and more particularly, the present invention relates to a heat dissipator for an optical writing and/or reproducing apparatus, which is constructed to properly dissipate heat generated in a heat generating element, especially, a drive IC (integrated circuit) while the optical writing and/or reproducing apparatus is driven.

2. Description of the Related Art

Generally, in an optical writing and/or reproducing apparatus such as a disk drive, a great amount of heat is generated during operation. In an optical writing and/or reproducing apparatus, heat generating parts include a loading motor for producing power needed to load and eject an optical disk, a spindle motor for rotating the optical disk, an optical pick-up for writing and/or reproducing data on and/or from the optical disk, a step motor for driving the optical pick-up, and elements installed on a circuit board for controlling operation of the optical writing and/or reproducing apparatus.

If generated heat is not properly dissipated out of the optical writing and/or reproducing apparatus, not only the corresponding heat generating source but also surrounding parts can be adversely affected by the heat, and thereby, an operational error can be caused in the optical writing and/or reproducing apparatus.

Specifically, among the elements installed on the circuit board for controlling operation of the optical writing and/or reproducing apparatus, a drive IC for controlling driving of the motors generates a substantial amount of heat when compared to the other elements.

FIG. 1 is a cross-sectional view illustrating a conventional heat dissipator for an optical writing and/or reproducing apparatus.

Referring to FIG. 1, an optical writing and/or reproducing apparatus includes a main base 30, and a circuit board 40 positioned below the main base 30. Elements for controlling operation of the optical writing and/or reproducing apparatus are installed on the circuit board 40. A spindle motor, a loading motor and a step motor (not shown) are installed on the main base 30.

Among the elements installed on the circuit board 40, since a drive IC 42 continuously controls driving of the motors, it consumes a large amount of power and thereby generates a substantial amount of heat when compared to the other elements. For this reason, the drive IC 42 is installed on a lower surface 40b of the circuit board 40 so as not to adversely influence, by heat, surrounding elements including an RF (radio frequency) IC and a DSP (digital signal processor) IC which are installed on an upper surface 40a of the circuit board 40. At this time, the drive IC 40 is installed in a manner such that outer leads 43 externally formed thereon are bonded to the lower surface 40b of the circuit board 40.

Hereafter, the conventional heat dissipator for dissipating heat generated in the drive IC 42 will be described in detail.

The heat dissipator includes a lower cabinet 51b which is positioned to face the lower surface 40b of the circuit board 40 and a heat dissipating conduction member 54 which is interposed between the lower cabinet 51b and a molding section 42a of the drive IC 42. The lower cabinet 51b delimits an outer contour of the optical writing and/or reproducing apparatus and is made of a metallic material. The heat conduction member 54 functions to dissipate or conduct the heat generated in the drive IC 42. Over a region where the lower cabinet 51b faces the molding section 42a of the drive IC 42, the lower cabinet 51b is formed with an upward protrusion 51c which projects toward the drive IC 42 to allow the heat dissipating conduction member 54 to be brought into close contact with the molding section 42a of the drive IC 42.

At this time, the heat conduction member 54 is not brought into contact with the outer leads 43 which serve to connect the drive IC 42 to the circuit board 40.

Concretely speaking, between the drive IC 42 installed on the lower surface 40b of the circuit board 40 and the lower cabinet 51b facing the drive IC 42, there is interposed the heat conduction member 54 in a manner such that it is brought into close contact with the molding section 42a of the drive IC 42. As a consequence, heat generated in the molding section 42a of the drive IC 42 is transmitted through the heat conduction member 54 to the lower cabinet 51b to be dissipated to the outside.

However, the conventional heat dissipator constructed as mentioned above suffers from defects as described below.

While heat generated inside the drive IC 42 is first conducted to a molding material, that is, the molding section 42a serving as an encapsulant, and then transmitted to the lower cabinet 51b, in actual fact, since a considerable portion of the heat generated inside the drive IC 42 is conducted to the outer leads 43 made of a metallic material, the outer leads 43 have a higher temperature than the molding material. Resultingly, as heat of the outer leads 43 is transmitted to a circuit pattern formed on the circuit board 40, the circuit pattern is likely to be thermally damaged.

Also, because the heat conduction member 54 is installed over the region which faces only a lower surface of the molding section 42a of the drive IC 42, heat of side surfaces of the drive IC 42 and heat of the outer leads 43 cannot be properly conducted to the heat dissipating conduction member 54. Therefore, heat as a whole, generated in the entire drive IC 42, cannot be properly transmitted to the lower cabinet 51b.

The reason for this is that only heat of the lower surface of the molding section 42a of the drive IC 42 is conducted to the heat conduction member 54 to be dissipated to the outside, and heat of the side surfaces of the drive IC 42 and heat of the outer leads 43 are dissipated to the outside only by convection through air.

SUMMARY OF THE INVENTION

Accordingly, the present invention has been made in an effort to solve the problems occurring in the related art, and an object of the present invention is to provide a heat dissipator for an optical writing and/or reproducing apparatus, which is constructed to properly dissipate heat generated in the optical writing and/or reproducing apparatus, thereby improving operational reliability of the optical writing and/or reproducing apparatus.

According to one aspect of the present invention, there is provided a heat dissipator for an optical writing and/or reproducing apparatus, comprising: a main base having mounted thereto a plurality of parts including at least one motor for optical writing and/or reproduction; a circuit board positioned below the main base and having installed thereon elements for controlling the parts; a heat generating element formed with a plurality of leads which are connected to a circuit pattern of the circuit board; a heat conduction member brought into contact with at least the leads, for receiving heat generated in the heat generating element; and a cabinet brought into contact with the heat conduction member and formed with an element accommodating section and/or a pair of protrusions which are shaped to be functionally associated with an outer surface of the heat generating element to ensure that the heat conduction member is brought into close contact with the leads of the heat generating element.

According to another aspect of the present invention, there is provided a heat dissipator for an optical writing and/or reproducing apparatus, comprising: a heat generating element installed on a circuit board and having a molding section which is formed with a plurality of leads connected to a circuit pattern of the circuit board; a cabinet formed with a pair of protrusions which project toward the heat generating element to allow a portion of heat generated in the heat generating element, which portion is conducted to the leads, to be dissipated to the outside; and a heat conduction member interposed between the cabinet and the heat generating element and brought into contact with at least the leads and/or the pair of projections.

According to still another aspect of the present invention, there is provided a heat dissipating structure adapted for dissipating heat generated in an optical writing and/or reproducing apparatus, comprising: a heat generating element having a molding section which is formed with a plurality of leads; a cabinet formed with an element accommodating section for accommodating the heat generating element and a pair of protrusions which delimit the element accommodating section; and a heat conduction member interposed between the heat generating element and the cabinet, for being brought into contact with the leads and the molding section and at the same time the element accommodating section and the pair of protrusions, whereby heat of the leads is transmitted to the protrusions to enhance a heat dissipation efficiency.

As described above, in the heat dissipator for an optical writing and/or reproducing apparatus according to the present invention, an element accommodating section is formed on a lower cabinet in a manner such that it is functionally associated with outer surfaces and outer leads of a heat generating element, and a heat conduction member is interposed between the element accommodating section and the heat generating element.

Hence, according to the present invention, advantages are provided in that, since heat is transmitted from the outer surfaces, that is, a lower surface and both side surfaces and the outer leads of the heat generating element to the heat conduction member, and dissipated through the lower cabinet to the outside, heat as a whole, generated in the heat generating element, can be properly dissipated to the outside. Also, because performance degradation of the heat generating element and surrounding parts due to overheating is prevented, operational reliability of the optical writing and/or reproducing apparatus can be improved.

Further, in the present invention, due to the fact that a size of the heat dissipating member is increased to be able to cover the entire drive IC including the outer leads, a heat dissipation efficiency is enhanced.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
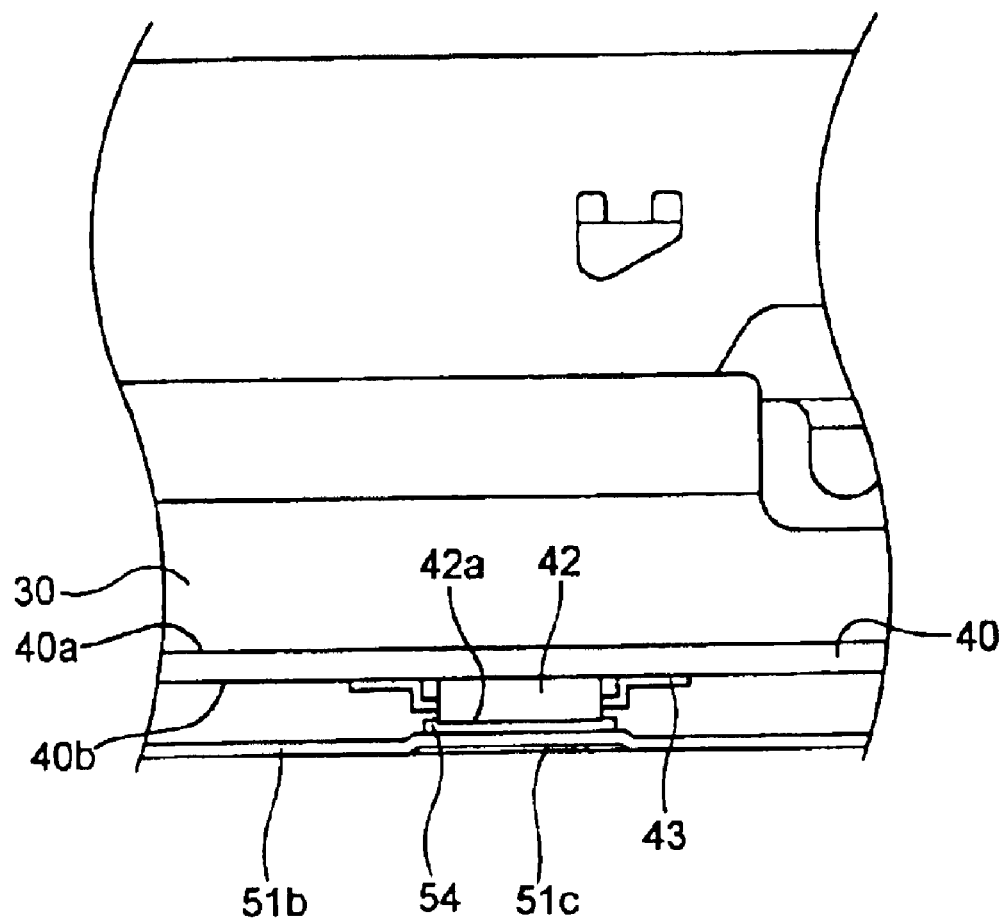
FIG. 1 is a cross-sectional view illustrating a conventional heat dissipator for an optical writing and/or reproducing apparatus.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
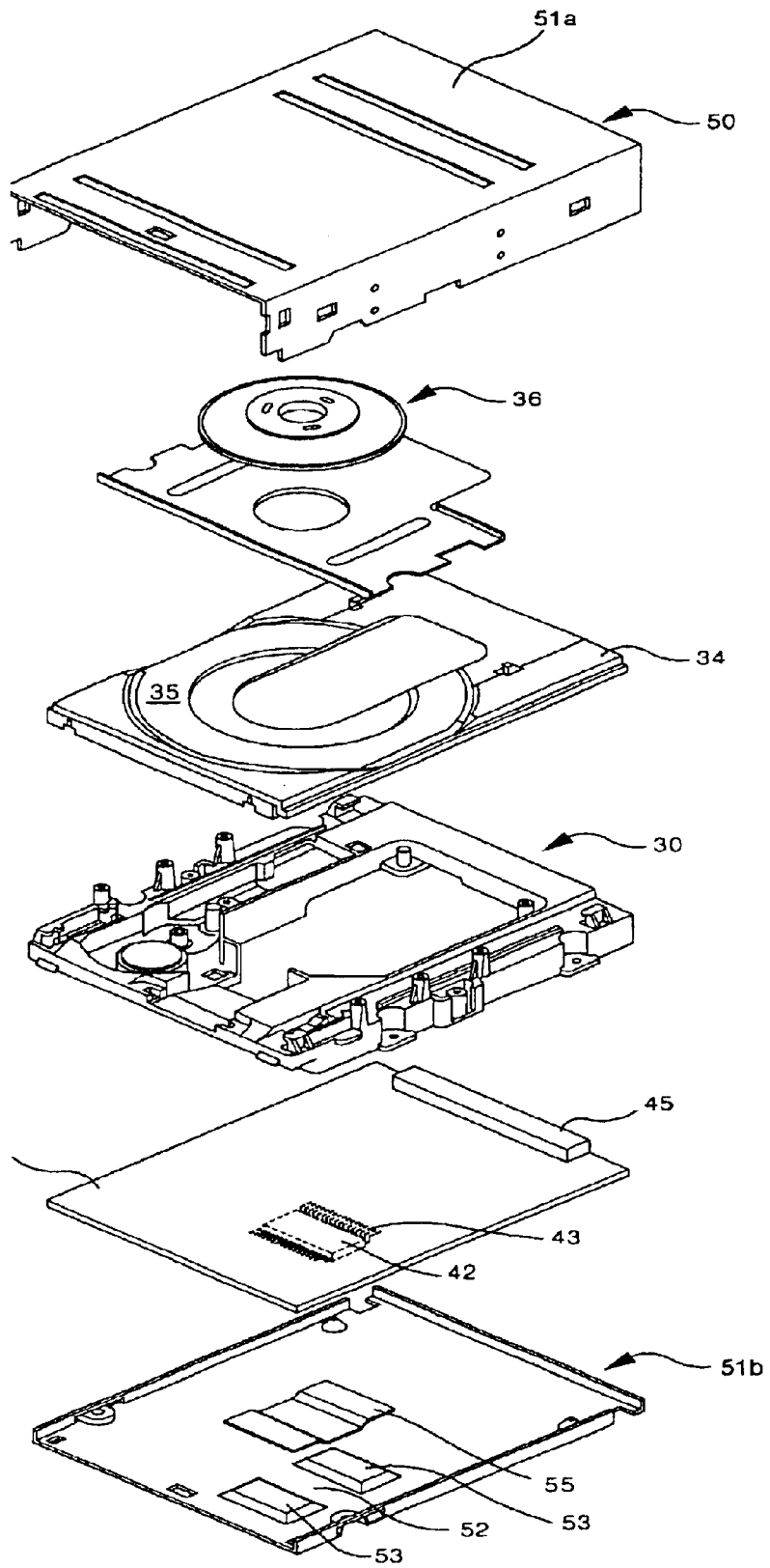
FIG. 2 is an exploded perspective view illustrating an optical writing and/or reproducing apparatus in which a heat dissipator in accordance with an embodiment of the present invention is used.

FIG. 2 is an exploded perspective view illustrating an optical writing and/or reproducing apparatus in which a heat dissipator in accordance with an embodiment of the present invention is used. In the present invention, the parts that correspond to those of FIG. 1 will be designated by the same reference numerals.

Describing in detail, with reference to FIG. 2, a construction of an optical writing and/or reproducing apparatus which adopts a heat dissipator in accordance with an embodiment of the present invention, the optical writing and/or reproducing apparatus includes a pick-up base (not shown) serving as a frame. A spindle motor for rotating an optical disk and an optical pick-up for radiating light to write and/or reproduce data on and/or from the optical disk are installed on the pick-up base. The optical writing and/or reproducing apparatus further includes a main base 30, a circuit board 40, a drive IC 42, a plurality of outer leads 43, upper and lower cabinets 51a and 51b, and a heat conduction member 54 55. A tray 34 for loading and ejecting the optical disk into and from the optical writing and/or reproducing apparatus is arranged on the main base 30. The circuit board 40 is positioned below the main base 30, and a variety of elements for driving the spindle motor, the optical pick-up, etc. are installed on the circuit board 40. The drive IC 42 is installed on a lower surface of the circuit board 40 to face an upper surface of the lower cabinet 51b. The plurality of outer leads 43 project out of both side surfaces of the drive IC 42 and are bonded to the circuit board 40 by soldering. The upper and lower cabinets 51a and 51b which constitute a cover 50 delimit an outer contour of the optical writing and/or reproducing apparatus and are made of a metallic material. The heat conduction member 54 55 functions to transmit heat generated in the drive IC 42 to the lower cabinet 51b thereby to dissipate the heat to the outside.

Describing in further detail the construction of the optical writing and/or reproducing apparatus which adopts the heat dissipator in accordance with the embodiment of the present invention, an upper surface 35 of the tray 34 serves as a disk seating surface on which the optical disk is seated upon being loaded and ejected. A clamp 36 is disposed above the tray 34 to clamp the optical disk to a turntable (not shown) provided to the spindle motor.

A connection socket 45 for permitting connection of the optical writing and/or reproducing element to another unit is installed at one end of the circuit board 40. The upper cabinet 51a defines an upper surface and both side surfaces of the optical writing and/or reproducing apparatus, and the lower cabinet 51b defines a lower surface of the optical writing and/or reproducing apparatus. However, it is to be readily understood that the present invention is not limited to such a structure, and the lower cabinet 51b can define a lower surface and both side surfaces of the optical writing and/or reproducing apparatus.

Generally, a rear surface of the optical writing and/or reproducing apparatus is defined by the main base 30, and a front surface is defined by a separate front plate (not shown).

According to the present invention, over a region where the lower cabinet 51b faces the drive IC 42, the lower cabinet 51b is formed with an element accommodating section 52. The element accommodating section 52 defines a space which can accommodate therein the entire drive IC 42. The element accommodating section 52 has a size which is larger than a width of the drive IC 42. The element accommodating section 52 is delimited by a pair of protrusions 53 which project toward the circuit board 40 at left and right sides of the element accommodating section 52. The pair of protrusions 53 are formed in a manner such that they face the outer leads 43 of the drive IC 42. In the illustrated embodiment, the drive IC 42 has a body which possesses a parallelepiped-shaped configuration, and the plurality of outer leads 43 which project outward from both side surfaces of the body. At this time, a lower surface and both side surfaces of the body of the drive IC 42 and the outer leads 43 projecting out of both side surfaces of the drive IC 42 are functionally associated with the upper surface of the lower cabinet 51b.

The element accommodating section 52, which is associated with the lower surface of the body of the drive IC 42, is formed to have the same height as a remaining portion of the lower cabinet 51b. And, the pair of protrusions 53, which are associated with the outer leads 43, project toward the circuit board 40 to extend upward beyond the lower surface of the body of the drive IC 42.

The heat conduction member 55 is made of soft silicon such as GAP PAD™ manufactured by BERGQUIST or Raychem™ manufactured by Tyco.

Figure 3:
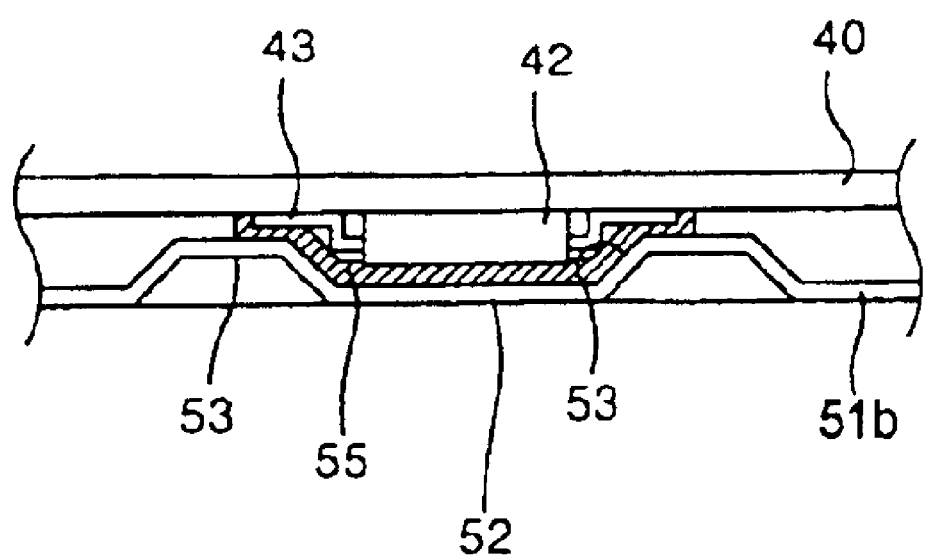
FIG. 3 is a cross-sectional view illustrating the heat dissipator according to the present invention.

FIG. 3 is a cross-sectional view illustrating the heat dissipator according to the present invention.

The construction of the heat dissipator according to the present invention will be described below in further detail with reference to FIG. 3.

The heat conduction member 54 55 is attached to the drive IC 42 which is installed on the lower surface of the circuit board 40. The heat conduction member 54 55 is made of a soft material and therefore can be freely deformed. A size of the heat conduction member 54 55 is determined in a manner such that it can be brought into sufficient contact with the lower surface and the outer leads 43 of the drive IC 42. Then, by assembling the lower cabinet 51b with respect to the heat conduction member 54 55, the body of the drive IC 42 is accommodated in the element accommodating section 52, and the pair of protrusions 53 bias the heat conduction member 54 55 to be brought into close contact with the outer leads 43.

Hereafter, working effects of the heat dissipator for an optical writing and/or reproducing apparatus according to the present invention, constructed as mentioned above, will be described in detail.

While the optical writing and/or reproducing apparatus is operated, heat is generated in a number of parts. The generated heat should be properly dissipated to the outside to prevent the corresponding heat generating source and surrounding parts to be adversely affected by the heat. In the optical writing and/or reproducing apparatus, heat generating parts include the optical pick-up, the spindle motor, a step motor, and the variety of elements including the drive IC 42.

The present invention is focused on dissipation of heat generated in the variety of elements including the drive IC 42. Description of the present embodiment will be given mainly in relation with the drive IC 42. While the optical disk is driven, a considerable amount of heat is generated in the drive IC 42 installed on the circuit board 40. The generated heat is partially dissipated to the outside through the lower surface and both side surfaces of the drive IC 42 and is partially conducted to the outer leads 43 made of a metallic material.

The heat conduction member 55, which is located in the element accommodating section 52 to be functionally associated with the lower surface and the outer leads 43 of the drive IC 42, is brought into contact with the lower surface and the outer leads 43 of the drive IC 42. Therefore, as the heat conduction member 55 receives heat from the lower surface and the outer leads 43 of the drive IC 42 and transmits the heat to the lower cabinet 51b, the heat is dissipated to the outside through the lower cabinet 51b.

That is to say, heat generated in the drive IC 42 is transmitted through its entire outer surface and the outer leads 43 to the heat conduction member 55. Accordingly, almost all of the heat generated in the drive IC 42 can be transmitted to the heat conduction member 55.

Experimental temperature data obtained by the heat dissipators according to the present invention and the conventional art, respectively, are presented below in TABLE 1.

TABLE 1

|  | Conventional lower cabinet | Present lower cabinet |
| --- | --- | --- |
| Optical pick-up | 63° C. | 62° C. |
| Spindle motor | 69° C. | 72° C. |
| Step motor | 71° C. | 74° C. |
| DSP IC | 75° C. | 76° C. |
| RF IC | 83° C. | 84° C. |
| Drive IC | 102° C. | 86° C. |
| Lower cabinet | 60° C. | 63° C. |
| Internal Space | 47° C. | 46° C. |

As can be readily seen from TABLE 1, in the case that the lower cabinet structure according to the present invention is applied to the heat dissipator, the drive IC 42 which usually has a highest temperature in an optical writing and/or reproducing apparatus is significantly reduced in its temperature to 86° C. when compared to its temperature of 102° C. under the conventional art. Further, a temperature of the lower cabinet 51b is slightly increased from 60° C. to 63° C. As a result, a person skilled in the art will readily recognize that, in the present invention, heat generated in the drive IC 42 is properly transmitted to the lower cabinet 51b through the heat conduction member 55 and dissipated to the outside.

Of course, it is to be noted that the heat dissipator according to the present invention can be employed not only in the drive IC but also other heat generating elements which are installed on the circuit board.

Preferably, the heat dissipating member comprises a heat dissipating pad.

More preferably, the heat dissipating pad is made of a suitable material such as silicon.

In the preferred embodiment of the present invention, as a heat generating element, the drive IC which is formed at both side surfaces thereof with the plurality of leads, was described. However, the present invention is not limited to this configuration of the drive IC, and it is possible to use a drive IC which is formed, at its four side surfaces, with leads. In this case, it is to be understood that four protrusions must be formed on the lower cabinet 51b.

As described above, in the present invention, since heat of the lower and side surfaces and the outer leads 43 of the drive IC 42 serving as a heat generating element in the optical writing and/or reproducing apparatus is transmitted to the heat conduction member 55 and dissipated to the outside through the lower cabinet 51b, proper heat dissipation is ensured.

Thus, because performance degradation of the heat generating element and surrounding parts due to overheating is prevented, operational reliability of the optical writing and/or reproducing apparatus can be improved.

Moreover, due to the fact that the element accommodating section 52 is formed to have the same height as the remaining portion of the lower cabinet 51b, the entire height of the optical writing and/or reproducing apparatus can be decreased.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed:

1. A heat dissipator for an electrical apparatus, comprising:
    a circuit board having installed thereon elements for controlling parts;
    a heat generating element formed with a plurality of leads which are connected to a circuit pattern of the circuit board;
    a heat conduction member brought into contact with at least the leads, for receiving heat generated in the heat generating element; and
    a cabinet brought into contact with the heat conduction member and formed with an element accommodating section and/or a pair of protrusions which are shaped to be functionally associated with an outer surface of the heat generating element to ensure that the heat conduction member is brought into close contact with the leads of the heat generating element.

2. The heat dissipator as set forth in claim 1, wherein the heat conduction member is made of soft silicon.

3. The heat dissipator as set forth in claim 1, wherein the heat generating element comprises a drive IC.

4. The heat dissipator as set forth in claim 1, wherein the heat conduction member is simultaneously brought into contact with a molding section and the leads of the heat generating element, and the element accommodating section and/or the pair of protrusions enable the heat conduction member to be brought into close contact with the molding section and the leads of the heat generating element.

5. The heat dissipator as set forth in claim 1, wherein the leads are formed at side surfaces of the heat generating element.

6. A heat dissipator for an electrical apparatus, comprising:
    a heat generating element installed on a circuit board of the electrical apparatus and having a molding section which is formed with a plurality of leads connected to a circuit pattern of the circuit board;
    a cabinet formed with a pair of protrusions which project toward the heat generating element to allow a portion of heat generated in the heat generating element, which portion is conducted to the leads, to be dissipated to the outside; and
    a heat conduction member interposed between the cabinet and the heat generating element and brought into contact with at least the leads and/or the pair of projections.

7. The heat dissipator as set forth in claim 6, wherein the heat conduction member is made of soft silicon.

8. The heat dissipator as set forth in claim 6, wherein the heat generating element comprises a drive IC.

9. The heat dissipator as set forth in claim 6, wherein the cabinet is formed with an element accommodating section which enables the heat conduction member to be brought into close contact with the molding section of the heat generating element.

10. The heat dissipator as set forth in claim 6, wherein the leads are formed at side surfaces of the heat generating element.

11. A heat dissipating structure adapted for dissipating heat generated in an electrical apparatus, comprising:
    a heat generating element on the electrical apparatus having a molding section which is formed with a plurality of leads;
    a cabinet formed with an element accommodating section for accommodating the heat generating element and a pair of protrusions which delimit the element accommodating section; and
    a heat conduction member interposed between the heat generating element and the cabinet, for being brought into contact with the leads and the molding section and at the same time the element accommodating section and the pair of protrusions, whereby heat of the leads is transmitted to the protrusions to enhance a heat dissipation efficiency.

12. The heat dissipating structure as set forth in claim 11, wherein the heat conduction member is made of soft silicon.

13. The heat dissipating structure as set forth in claim 11, wherein the heat generating element comprises a drive IC.

14. The heat dissipating structure as set forth in claim 11, wherein the heat conduction member comprises a heat dissipating pad.

15. The heat dissipating structure as set forth in claim 11, wherein the leads are formed at side surfaces of the heat generating element.

16. A heat dissipator for an electrical apparatus, comprising:
    a circuit board positioned having installed thereon elements for controlling parts;
    a heat generating element formed with a plurality of leads which are connected to a circuit pattern of the circuit board and producing heat during operation;
    a heat conduction member brought into contact with at least the leads, for receiving heat generated in the heat generating element; and
    a cabinet contact with the heat conduction member and having at least one protrusion to ensure that the heat conduction member being closely contacted with the leads of the heat generating element.

17. The heat dissipator as set forth in claim 16, wherein the heat conduction member is made of soft silicon.

18. The heat dissipator as set forth in claim 16, wherein the cabinet is formed with an element accommodating section which enables the heat conduction member to be contacted with a molding section of the heat generating element.

19. The heat dissipator as set forth in claim 16, wherein the leads are formed at side surfaces of the heat generating element.

* * * * *